US012135471B2

(12) United States Patent
Bhat et al.

(10) Patent No.: US 12,135,471 B2
(45) Date of Patent: Nov. 5, 2024

(54) CONTROL OF AN ELECTRONIC CONTACT LENS USING EYE GESTURES

(71) Applicant: Tectus Corporation, Saratoga, CA (US)

(72) Inventors: Abhishek Deepak Bhat, Santa Clara, CA (US); Dominic Philip Haine, Burlingame, CA (US); Ben Rafael Kimel Green, Alameda, CA (US); Ramin Mirjalili, San Jose, CA (US)

( * ) Notice: Subject to any disclaimer, the term of this patent is extended or adjusted under 35 U.S.C. 154(b) by 617 days.

(21) Appl. No.: 17/471,655

(22) Filed: Sep. 10, 2021

(65) Prior Publication Data

US 2023/0082702 A1    Mar. 16, 2023

(51) Int. Cl.
G02C 7/04       (2006.01)
A61B 3/02       (2006.01)
A61B 3/10       (2006.01)
A61B 3/117      (2006.01)
A61F 9/02       (2006.01)
G02C 7/08       (2006.01)
G02C 11/00      (2006.01)
G06F 3/01       (2006.01)

(52) U.S. Cl.
CPC .............. *G02C 7/083* (2013.01); *G02C 7/04* (2013.01); *G02C 11/10* (2013.01); *G06F 3/013* (2013.01); *G06F 3/017* (2013.01)

(58) Field of Classification Search
CPC ......... A61B 3/02; A61B 3/102; A61B 3/1025; A61B 3/113; A61B 3/1015; A61B 3/103; A61B 3/117; A61B 3/1225

USPC ... 351/159.02, 200, 205, 206, 209–211, 219, 351/221, 246, 41
See application file for complete search history.

(56) References Cited

U.S. PATENT DOCUMENTS 4,871,247 A    10/1989  Haynes
5,844,544 A    12/1998  Kahn
(Continued)

FOREIGN PATENT DOCUMENTS

CN    106445115 A    2/2017
CN    107092346 A    8/2017
(Continued)

OTHER PUBLICATIONS

Christiansen et al., editors. Motion Sensors Explainer. W3C Working Group Note, Aug. 30, 2017. retrieved from [https://www.w3.org/TR/motion-sensors/] on [Oct. 21, 2021]. (Year: 2017).
(Continued)

*Primary Examiner* — Dawayne Pinkney
(74) *Attorney, Agent, or Firm* — AMSEL IP LAW PLLC; Jason Amsel

(57) ABSTRACT

A system includes an electronic contact lens that can detect eye gestures for initiating various actions. The electronic contact lens includes integrated sensors for obtaining sensor measurements characterizing eye motion. The sensor measurements are processed to detect gestures mapped to specific actions such as changing a power state of the electronic contact lens, activating or deactivating a user interface or other feature, or selecting an item from a virtual menu. The eye gestures may involve the user sequentially performing a first saccade quickly followed by a second saccade in an opposite direction from the first saccade.

22 Claims, 9 Drawing Sheets

(56) References Cited

U.S. PATENT DOCUMENTS

| | | | |
|---|---|---|---|
| 6,027,216 A | 2/2000 | Guyton |
| 7,431,458 B2 | 10/2008 | Jongsma |
| 7,542,210 B2 | 6/2009 | Chirieleison, Sr. |
| 7,626,562 B2 | 12/2009 | Iwasaki |
| 8,430,310 B1 | 4/2013 | Ho |
| 8,446,341 B2 | 5/2013 | Amirparviz |
| 8,520,309 B2 | 8/2013 | Sprague |
| 8,764,185 B1 | 7/2014 | Biederman |
| 8,786,675 B2 | 7/2014 | Deering |
| 8,798,332 B2 | 8/2014 | Otis |
| 8,827,445 B1 | 9/2014 | Wiser |
| 8,870,370 B1 | 10/2014 | Otis |
| 8,874,182 B2 | 10/2014 | Etzkorn |
| 8,890,946 B2 | 11/2014 | Publicover |
| 8,911,087 B2 | 12/2014 | Publicover |
| 8,960,898 B1 | 2/2015 | Etzkorn |
| 8,964,298 B2 | 2/2015 | Haddick |
| 8,971,978 B2 | 3/2015 | Ho |
| 8,989,834 B2 | 3/2015 | Ho |
| 9,028,068 B2 | 5/2015 | Chang |
| 9,040,923 B2 | 5/2015 | Sprague |
| 9,047,512 B2 | 6/2015 | Otis |
| 9,052,533 B2 | 6/2015 | Pugh |
| 9,111,473 B1 | 8/2015 | Ho |
| 9,153,074 B2 | 10/2015 | Zhou |
| 9,170,646 B2 | 10/2015 | Toner |
| 9,196,094 B2 | 11/2015 | Ur |
| 9,215,293 B2 | 12/2015 | Miller |
| 9,298,002 B2 | 3/2016 | Border |
| 9,298,020 B1 | 3/2016 | Etzkorn |
| 9,341,843 B2 | 5/2016 | Border |
| 9,390,326 B2 | 7/2016 | Publicover |
| 9,405,365 B2 | 8/2016 | Publicover |
| 9,600,069 B2 | 3/2017 | Publicover |
| 9,837,052 B2 | 12/2017 | Deering |
| 9,870,060 B2 | 1/2018 | Marggraff |
| 9,921,645 B2 | 3/2018 | Theytaz |
| 10,025,379 B2 | 7/2018 | Drake |
| 10,098,543 B2 * | 10/2018 | Kinkingnehun ....... A61B 3/145 |
| 10,178,367 B2 | 1/2019 | Zhou |
| 10,345,621 B2 | 7/2019 | Franklin |
| 10,353,463 B2 | 7/2019 | Shtukater |
| 10,718,957 B2 | 7/2020 | Wiemer |
| 10,901,505 B1 | 1/2021 | Haine |
| 2004/0155907 A1 | 8/2004 | Yamaguchi |
| 2009/0066722 A1 | 3/2009 | Kriger |
| 2010/0231504 A1 | 9/2010 | Bloem |
| 2011/0221659 A1 | 9/2011 | King, III |
| 2013/0145304 A1 | 6/2013 | Deluca |
| 2013/0258287 A1 | 10/2013 | Pugh |
| 2014/0063054 A1 | 3/2014 | Osterhout |
| 2014/0098226 A1 | 4/2014 | Pletcher |
| 2014/0168056 A1 | 6/2014 | Swaminathan |
| 2014/0198128 A1 | 7/2014 | Hong |
| 2014/0243971 A1 | 8/2014 | Pugh |
| 2014/0268029 A1 | 9/2014 | Pugh |
| 2014/0347265 A1 | 11/2014 | Aimone |
| 2014/0354539 A1 | 12/2014 | Skogö |
| 2015/0049004 A1 | 2/2015 | Deering |
| 2015/0143234 A1 | 5/2015 | Norris, III |
| 2015/0192992 A1 | 7/2015 | Di Censo |
| 2015/0205106 A1 | 7/2015 | Norden |
| 2015/0212576 A1 | 7/2015 | Ambrus |
| 2015/0235439 A1 | 8/2015 | Schowengerdt |
| 2015/0235440 A1 | 8/2015 | Schowengerdt |
| 2015/0235444 A1 | 8/2015 | Schowengerdt |
| 2015/0235446 A1 | 8/2015 | Schowengerdt |
| 2015/0235457 A1 | 8/2015 | Schowengerdt |
| 2015/0235468 A1 | 8/2015 | Schowengerdt |
| 2015/0235471 A1 | 8/2015 | Schowengerdt |
| 2015/0241698 A1 | 8/2015 | Schowengerdt |
| 2015/0243090 A1 | 8/2015 | Schowengerdt |
| 2015/0261294 A1 | 9/2015 | Urbach |
| 2015/0301338 A1 | 10/2015 | Van Heugten |
| 2015/0312560 A1 | 10/2015 | Deering |
| 2015/0338915 A1 | 11/2015 | Publicover |
| 2015/0339857 A1 | 11/2015 | O'Connor |
| 2015/0362749 A1 | 12/2015 | Biederman |
| 2015/0362750 A1 | 12/2015 | Yeager |
| 2015/0362753 A1 | 12/2015 | Pletcher |
| 2016/0011419 A1 | 1/2016 | Gao |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0025981 A1 | 1/2016 | Burns |
| 2016/0091737 A1 | 3/2016 | Kim |
| 2016/0097940 A1 | 4/2016 | Sako |
| 2016/0133201 A1 | 5/2016 | Border |
| 2016/0195924 A1 | 7/2016 | Weber |
| 2016/0253831 A1 | 9/2016 | Schwarz |
| 2016/0274660 A1 | 9/2016 | Publicover |
| 2016/0283595 A1 | 9/2016 | Folkens |
| 2016/0299357 A1 | 10/2016 | Hayashi |
| 2017/0019661 A1 | 1/2017 | Deering |
| 2017/0023793 A1 | 1/2017 | Shtukater |
| 2017/0111619 A1 | 4/2017 | Benosman |
| 2017/0115742 A1 | 4/2017 | Xing |
| 2017/0116897 A1 | 4/2017 | Ahn |
| 2017/0123492 A1 | 5/2017 | Marggraff |
| 2017/0131764 A1 | 5/2017 | Bognar |
| 2017/0177078 A1 | 6/2017 | Henderek |
| 2017/0264879 A1* | 9/2017 | Zhou ....................... G06F 3/013 |
| 2017/0270636 A1 | 9/2017 | Shtukater |
| 2017/0285742 A1 | 10/2017 | Marggraff |
| 2017/0371184 A1 | 12/2017 | Shtukater |
| 2018/0120568 A1 | 5/2018 | Miller |
| 2018/0149884 A1 | 5/2018 | Miller |
| 2018/0180980 A1 | 6/2018 | Ouderkirk |
| 2018/0275753 A1 | 9/2018 | Publicover |
| 2018/0335835 A1 | 11/2018 | Lemoff |
| 2018/0348969 A1 | 12/2018 | Kawamura |
| 2019/0025607 A1 | 1/2019 | Liao |
| 2019/0025608 A1 | 1/2019 | Liao |
| 2019/0056785 A1 | 2/2019 | Suk |
| 2019/0107734 A1 | 4/2019 | Lee |
| 2019/0235276 A1 | 8/2019 | Wiemer |
| 2019/0235624 A1 | 8/2019 | Goldberg |
| 2019/0250408 A1 | 8/2019 | Lafon |
| 2019/0250432 A1 | 8/2019 | Kim |
| 2019/0307399 A1 | 10/2019 | Gutierrez |
| 2019/0377428 A1 | 12/2019 | Mirjalili |
| 2019/0390976 A1 | 12/2019 | Anderson |
| 2020/0073122 A1 | 3/2020 | Rothkopf |
| 2021/0026444 A1 | 1/2021 | Haine |
| 2021/0072821 A1 | 3/2021 | Von Und Zu Liechtenstein |
| 2021/0124415 A1 | 4/2021 | Haine |
| 2021/0208674 A1 | 7/2021 | Haine |
| 2022/0046156 A1 | 2/2022 | Lemoff |
| 2022/0121344 A1 | 4/2022 | Pastrana Vicente |

FOREIGN PATENT DOCUMENTS

| | | | |
|---|---|---|---|
| WO | 2006015315 A2 | 2/2006 |
| WO | 2016195201 A1 | 12/2016 |
| WO | 2018109570 | 6/2018 |

OTHER PUBLICATIONS

CN107092346A English translation (Year: 2017).
International Search Report and Written Opinion for Application No. PCT/US2019/015338, date of mailing Apr. 11, 2019, 15 pages.
International Search Report and Written Opinion in PCT/US2020/056376, dated Jan. 12, 2021, 10 pages.
Ioannou, S. et al., "Proximity and Gaze Influences Facial Temperature: A Thermal Infrared Imaging Study," Frontiers in Psychology, Aug. 2014, pp. 1-12, vol. 5, Article 845.
ITMO University. New femto-camera with quadrillion fractions of a second resolution. Eureka Alert. Jun. 21, 2017. [Retrieved Mar. 18, 2019]. Retrieved from: https://www.eurekalert.org/pub_releases/2017-06/iu-nfw062117.php> entire document (3 pages).
Kim, J. et al., "3D Multi-Spectrum Sensor System with Face Recognition," Sensors, 2013, pp. 12804-12829, vol. 13.

(56) References Cited

OTHER PUBLICATIONS

Lingley et al., "A single-pixel wireless contact lens display" J. Micromech. Microeng. 21 125014. (Year: 2011), 9 pages.

Liu, Y. et al., "Facial Expression Recognition with Fusion Features Extracted from Salient Facial Areas," Sensors, 2017, pp. 1-18, vol. 17, No. 712.

Lu, J. et al., "A 1 TOPS/W Analog Deep Machine-Learning Engine With Floating-Gate Storage in 0.13|jm CMOS," IEEE Journal of Solid-State Circuits, Jan. 2015, pp. 270-281, vol. 50, No. 1.

Merla, A., "Thermal Expression of Intersubjectivity Offers New Possibilities to Human-Machine and Technologically Mediated Interactions," Frontiers in Psychology, Jul. 2014, pp. 1-6, vol. 5, Article 802.

WO2016195201A1 English translation (Year: 2016).

\* cited by examiner

CONTROL OF AN ELECTRONIC CONTACT LENS USING EYE GESTURES

BACKGROUND

1. Technical Field

This disclosure relates generally to controlling an electronic contact lens using eye gestures.

2. Description of Related Art

An electronic contact lens may include various integrated electronic components such as projectors, imaging devices, sensors, and batteries. The electronic contact lens may enable augmented reality applications in which images are projected by the electronic contact lens onto the user's retina to augment the user's view of the external environment. The electronic contact lens may include integrated motion sensors for tracking eye movements that may be used to control various functions of the electronic contact lens.

DETAILED DESCRIPTION

A system includes an electronic contact lens that can detect eye gestures for initiating various actions. The electronic contact lens includes integrated sensors for obtaining sensor measurements characterizing eye motion. The sensor measurements are processed to detect gestures mapped to specific actions such as changing a power state of the electronic contact lens, activating or deactivating a user interface or other feature, or selecting an item from a virtual menu.

To provide a quality user experience, eye gestures should be detectable with low rates of false positives. For example, it is desirable for the electronic contact lens system to consistently distinguish between intentional eye gestures and other eye or head movements that are not intended to invoke an action. Furthermore, it is desirable to utilize eye gestures that are detectable with low rates of false negatives and that are easy for a user to perform consistently.

An example class of eye gestures that meets the above characteristics involves the user sequentially performing a first saccade quickly followed by a second saccade in an opposite direction from the first saccade. In one variation, the first saccade involves a relatively larger movement of the eye in the first direction (e.g., from a centered gaze orientation to a peripheral gaze orientation), and the second saccade involves a relatively smaller movement in the opposite direction that does not go past the starting orientation (e.g., from the peripheral orientation to an intermediate orientation between the centered and peripheral orientations). In another variation, the first saccade involves a relatively smaller movement of the eye in the first direction (e.g., from a center orientation to an intermediate orientation between the centered and peripheral orientations), and the second saccade involves a relatively larger movement of the eye in the opposite direction that crosses over the starting orientation (e.g., from the intermediate orientation to a peripheral orientation). These eye gestures can be invoked in horizontal directions (left to right or right to left), vertical directions (up to down or down to up), or any along any other axis. The electronic contact lens system can be programmed to invoke different actions depending on the type and direction of the detected eye gesture.

Figure 1A:
FIG. 1A shows a user wearing an electronic contact lens.
Figure 1B:
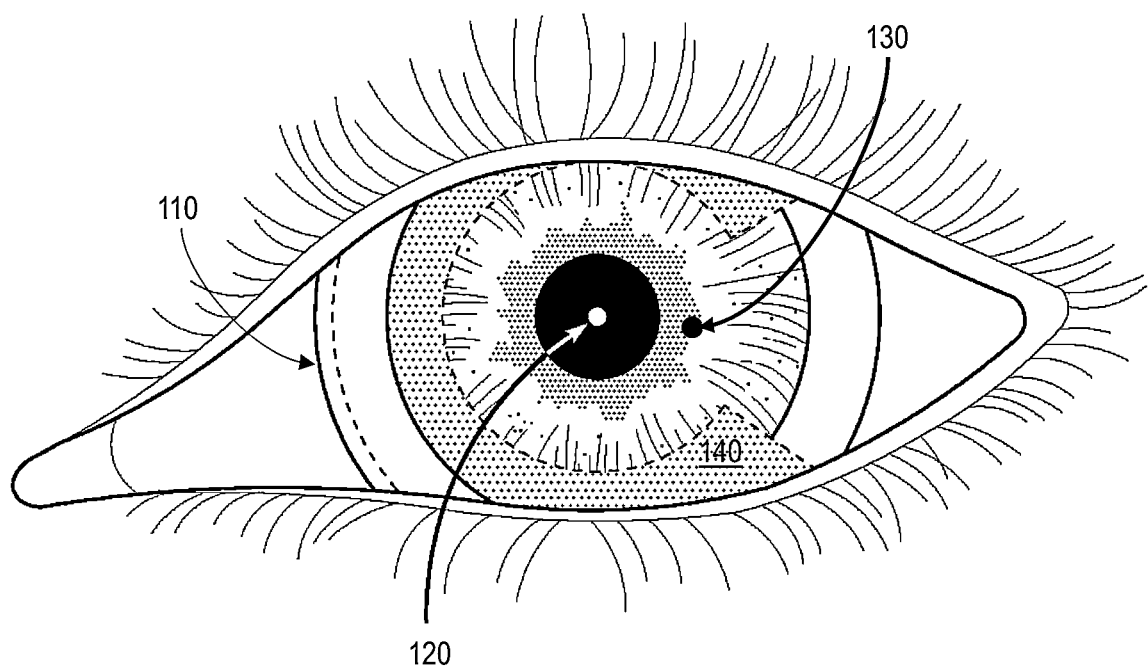
FIG. 1B shows a magnified and simplified view of the electronic contact lens mounted on the user's eye.
Figure 1C:
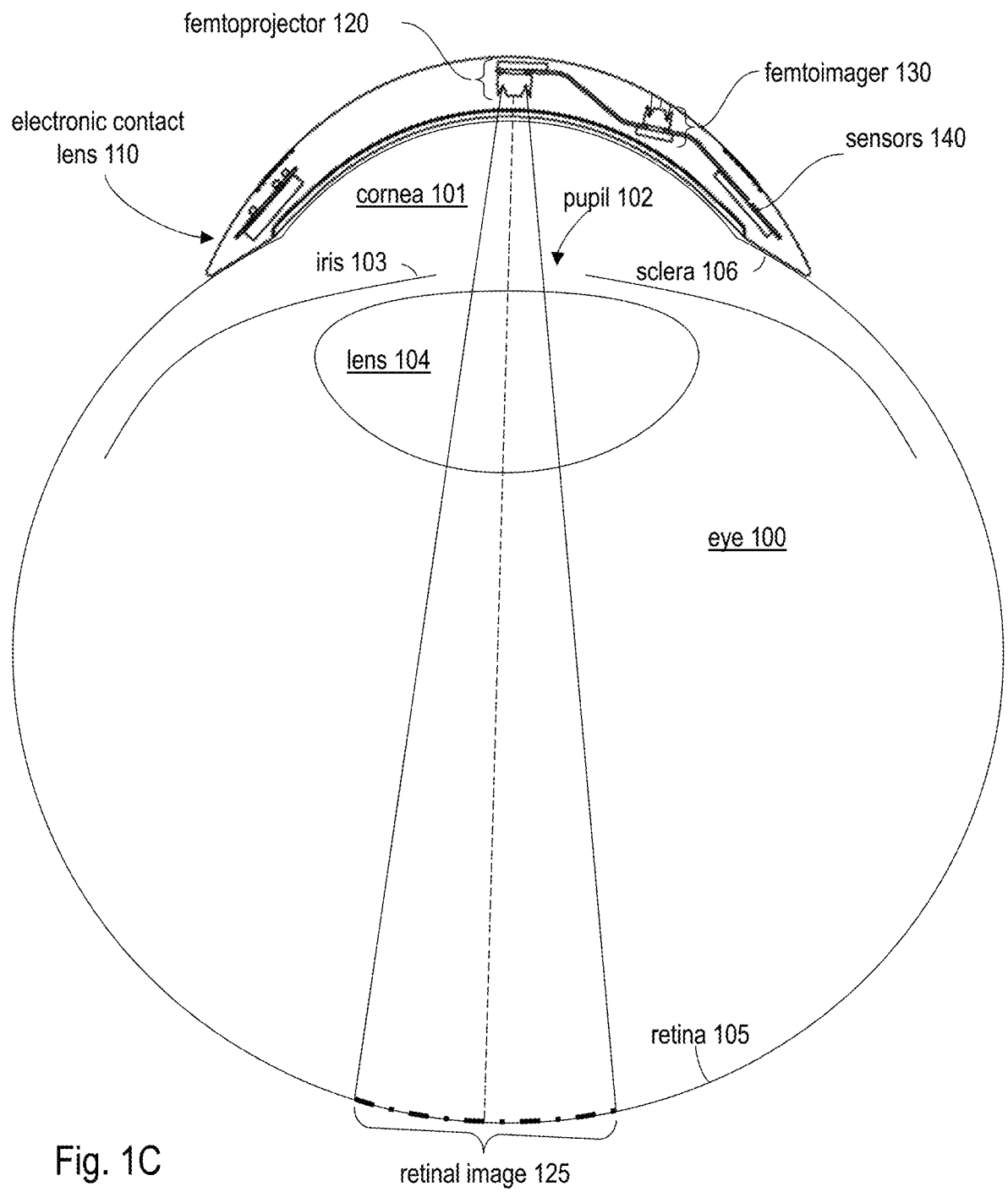
FIG. 1C shows a cross sectional view of the electronic contact lens mounted on the user's eye.

FIG. 1A shows a user wearing a pair of electronic contact lenses 110. In other instances, the user may wear only a single electronic contact lens 110 in just one eye. FIG. 1B shows a magnified view of an electronic contact lens 110, and FIG. 1C shows a cross sectional view of the electronic contact lens 110. The following examples use a scleral contact lens in which the contact lens is supported by the sclera of the user's eye, but the contact lens does not have to be scleral.

As shown in FIG. 1B, the electronic contact lens 110 contains a femtoprojector 120, a femtoimager 130, and sensors 140. The femtoprojector 120 and femtoimager 130 are optional, and in other embodiments, the electronic contact lens 110 may omit these components.

The optional femtoprojector 120 is a small projector that projects images inward onto the user's retina. It is located in a central region of the contact lens 110, so that light from the femtoprojector 120 propagates through the user's pupil to the retina. The femtoprojector 120 typically includes an electronics backplane (e.g., driver circuitry), a front plane of light emitting elements (e.g., an LED array) and projection optics. The front plane produces an image (referred to as the source image), which is optically projected by the projection optics through the various eye structures and onto the retina 105, as shown in FIG. 1C.

The optional femtoimager 130 is a small imager that is outward facing and captures images of the external environment. In this example, it is located outside the central region of the contact lens 110 so that it does not block light from entering the user's eye. The femtoimager 130 typically includes imaging optics, a sensor array, and sensor circuitry. The imaging optics images a portion of the external environment onto the sensor array, which captures the image. The sensor array may be an array of photosensors. In some embodiments, the sensor array operates in a visible wavelength band (i.e., —390 nm to 770 nm). Alternatively or additionally, the sensor array operates in a non-visible wavelength band, such as an infrared (IR) band (i.e., ~750 nm to 10 μm) or an ultraviolet band (i.e., <390 nm). For example, the sensor array may be a thermal infrared sensor.

The femtoprojector 120 and femtoimager 130 typically are not larger than 2 mm wide. They may fit within a 2 mm×2 mm×2 mm volume. In an embodiment, the electronic contact lens 110 has a thickness that is less than two millimeters.

The sensors 140 and other associated electronics may be mounted on a flexible bus located in a peripheral zone of the electronic contact lens 110. The sensors 140 may include motion sensors such as an accelerometer and a gyroscope. The sensors 140 may furthermore include a magnetometer and additional sensors such as temperature sensors, light sensors, and audio sensors. Sensed data from the sensors 140 may be combined to estimate position, velocity, acceleration, orientation, angular velocity, angular acceleration or other motion parameters of the eye. For example, in one embodiment, gyroscope data, magnetometer data, and accelerometer data may be combined in a filter to estimate the orientations. Furthermore, gyroscope measurements may be compensated for variations in temperature.

The electronic contact lens 110 may furthermore include various other electronic components (not shown) such as a radio transceiver, power circuitry, an antenna, a battery, or inductive charging coils. The electronic contact lens 110 may also include cosmetic elements, for example covering the sensors 140 or other electronic components. The cosmetic elements may be surfaces colored to resemble the iris and/or sclera of the user's eye.

FIG. 1C shows a cross sectional view of the electronic contact lens mounted on the user's eye. FIG. 1C illustrates some structures of the eye 100 including the cornea 101, pupil 102, iris 103, lens 104, retina 105, and sclera 106. The contact lens 110 maintains eye health by permitting oxygen to reach the cornea 101.

As shown in FIG. 1C, the optional femtoimager 130 is outward-facing, so that it captures images of the surrounding environment, while the optional femtoprojector 120 is inward-facing and projects an image 125 onto the user's retina 105. The femtoimager 130, femtoprojector 120, and sensors 140 all move together with the eye 100 because the electronic contact lens 110 is physically mounted to the eye 100. Thus, the sensors 140 naturally capture motion of the eye. Furthermore, images captured by the femtoimager 130 naturally have a line of sight corresponding to the user's gaze direction and virtual images projected by the femtoprojector 120 naturally move together with the eye 100.

Figure 2:
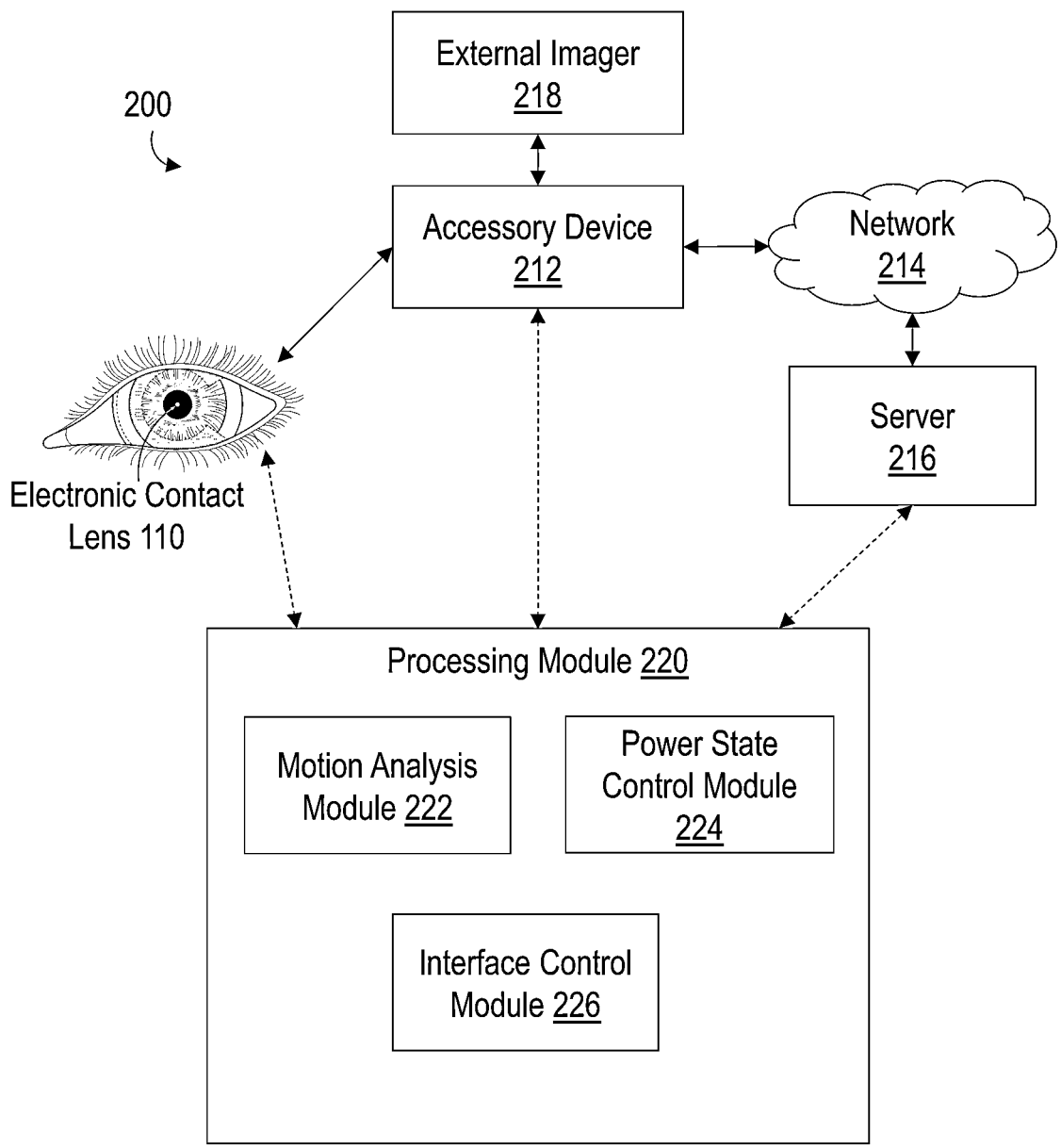
FIG. 2 is a block diagram of an electronic contact lens system.

FIG. 2 shows a block diagram of an electronic contact lens system 200. The electronic contact lens system 200 includes the electronic contact lens 110, as described above, an accessory device 212, a network 214, a server 216, and an optional external imager 218. The accessory device 212 is a computing device that is communicatively coupled to the electronic contact lens 110 (e.g., via a wireless interface) and performs computing or storage functions that support operation of the electronic contact lens 110. The accessory device 212 may be embodied as an electronic wearable device (e.g., necklace, headband, waistband, etc.), smartphone, smart-watch or another device. The accessory device 212 may also be connected to a server 216 via a network 214. The server 216 provides access to various information relevant to operation of the electronic contact lens 110 and may furthermore provide additional computing or storage functions that support operation of the electronic contact lens 110. The external imager 218, if present, captures images of the external environment and may be used to supplement images captured by the optional femtoimager 130 of the electronic contact lenses 110. The external imager 218 may capture images having a wider field of view, higher resolution or other improved image characteristics relative to the images captured by the femtoimager 130.

A processing module 220 interfaces with the electronic contact lens 110 to track motion data of the electronic contact lens, detect eye gestures, and initiate actions responsive to the detected eye gestures. The processing module 220 may furthermore perform other functions of the electronic contact lens 110 such as generating virtual images for display using the femtoprojector 120, processing images obtains from the femtoimager 130, or other tasks.

Various components of the processing module 220 may be implemented in whole or in part in the electronic contact lens 110, the accessory device 212, the server 216, or a combination thereof. In some implementations, certain time-sensitive functions of the processing module 220 may be implemented directly on the electronic contact lenses 110 for low latency while other more computationally intensive functions may be offloaded to the accessory device 212 or to the server 216 to enable the electronic contact lens 110 to operate with relatively light computational and storage requirements. For example, in one implementation, the electronic contact lens 110 transfers the raw sensor data to the accessory device 212 for processing. The accessory device 212 may process the data directly or may offload one or more functions in whole or in part to the server 216. Alternatively, the electronic contact lens 110 may perform some lightweight initial processing on the sensor data and send the initially processed sensor data to the accessory device 212. For example, the electronic contact lens 110 may perform some filtering or compression of the sensor data. Responsibility for other tasks such as generating virtual images and processing captured image data may similarly be shared between the electronic contact lenses 110, accessory device 212, and server 216 in different ways.

The processing module 220 includes a motion analysis module 222, a power state control module 224, and an interface control module 226. Other embodiments may include different, additional, or fewer components.

The motion analysis module 222 processes sensor measurements from the electronic contact lens 110 to detect occurrences of one or more eye gestures. Here, the motion analysis module 222 may apply various filters and/or functions to the raw sensor data (e.g., from the accelerometer, gyroscope, magnetometer, or other sensors) to detect a sequence of movements consistent with a predefined eye gesture. For example, each eye gesture may be defined by a set of sequentially executed motion segments each characterized by different motion criteria. An eye gesture is detected only when a sequence of motions is sensed that meets the respective criteria for the motion segments defining the eye gesture.

In an embodiment, the sensor measurements processed by the motion analysis module 222 may include image data from the femtoimager 130. Here, for example, the motion analysis module 222 may perform image-based motion analysis techniques on images captured from the femtoimager 130 over time that may be used alone or in conjunction with other sensor data to estimate changes in eye orientation and detect eye gestures.

In an embodiment, the motion analysis module 222 may optionally obtain and analyze sensor data from sensors external to an electronic contact lens 110. For example, head-mounted sensors or external cameras may be used to track head position. The motion analysis module 222 may utilize this data to estimate gaze orientation relative to the head (e.g., whether the gaze position is centered or at a peripheral region).

In an example implementation, the motion analysis module 222 comprises a state machine having a sequence of states that each correspond to one of the motion segments of the eye gesture. Beginning at a starting state corresponding to a first motion segment, the state machine compares motion data in a recent time window to motion criteria defining the first motion segment. The state machine progresses to the next state when the detected motion is consistent with the first motion segment. In the next state, a different set of criteria is applied to a subsequent time window of motion data to determine if the motion data in the subsequent time window is consistent with the next defined motion segment of the eye gesture. The state machine continues to progress in this matter as each segment of the eye gesture is detected. Otherwise, if the detected motion at any given state is inconsistent with the defined motion segment for that state, the state machine returns to the starting state. Thus, an eye gesture is detected only when the full set of motion segments is sequentially detected, and the state machine reaches an end state.

In an embodiment, the motion analysis module 222 may comprise two or more state machines executing in parallel. Here, when one state machine advances past the initial state, another state machine may initiate in the initial state to determine if a subsequent eye movement corresponds to the first motion segment. This embodiment ensures that the start of the gesture is not missed when the initial state machine advances past the initial state but fails to detect later motion segments of an eye gesture.

For each state of the state machine, the motion criteria may be defined positively (i.e., the state machine progresses when the specified criteria for the current state are met) or negatively (i.e., the state machine is reset to the starting state when the criteria for the current state are met). The criteria for detecting each motion segment of the eye gesture may be based on factors such as changes in orientation, velocity, or acceleration associated with movements, durations of time associated with movements or in between movements, or other factors that collectively describe a detectable eye gesture. In other embodiments, the criteria for each state may be defined in terms of specific types of detectable eye movements (such as saccades, microsaccades, smooth pursuits, drifts, fixations, etc.) and characteristics of those movements. Specific examples of eye gestures and techniques for detecting them are described in further detail below with respect to FIGS. 3-6.

The power state control module 224 controls a power state of the electronic contact lens 110. The power state may be controlled, at least in part, in response to a detected eye gesture. In an embodiment, the electronic contact lens 110 can operate in at least a low power state and a full power state. In some embodiments, additional power states may be available. In the low power state, the electronic contact lens 110 operates with limited functionality to conserve power. In one example implementation, the electronic contact lens 110 may enable only functions for detecting a trigger event that causes the electronic contact lens 110 to transition to the full power state. Thus, at least the femtoimager 130 and femtoprojector 120 may be deactivated in the low power state. In one embodiment, the electronic contact lens 110 furthermore disables the gyroscope in the low power state. In this case, the electronic contact lens 110 uses only the accelerometer and magnetometer data to detect an eye gesture that activates the full power state, which then enables the gyroscope, the femtoimager 130, and femtoprojector 120, or other components.

When operating in the full power state, the electronic contact lens 110 may activate a wider set of sensors (e.g., the gyroscope), the femtoimager 130, and/or the femtoprojector 120 to enable various user functions. An eye gesture may furthermore be utilized to transition the electronic contact lens 110 from the full power state back to the low power state.

In other implementations, the power state control module 224 may perform some automatic transitions between power states. For example, if the user is wearing two electronic contact lenses 110, one lens 110 may operate in the low power state described above while the other lens 110 may operate in a sleep state in which it does not track eye motion. When the lens 110 in the low power state detects an eye gesture for transitioning to the full power state, it transitions to the full power state and sends a signal to the other contact lens 110 to cause it to enter the full power state. In an embodiment, the lenses 110 may automatically switch which lens 110 operates in the low power state and which operates in the sleep state. The lenses 110 may switch periodically or based on their relatively battery levels. For example, the lens 110 with the lower battery level may be configured to operate in the sleep state and the lens 110 with the higher battery level operates in the low power state.

The interface control module 226 controls various user functions of the electronic contact lens 110 that may be invoked responsive to a detected eye gesture or other command input (e.g., a voice input). The interface control module 226 may generate a user interface displayed by the femtoprojector 120 including virtual elements that the user may interact with such as virtual objects, text, menus, or other elements. Eye gestures may be detected to initiate actions such as activating or deactivating a virtual menu, selecting an item of a virtual menu, switching between virtual menus, interacting with virtual objects, or controlling settings of the electronic contact lens 110. In an embodiment, different types of eye gestures or performing eye gestures of the same type in different directions may invoke different actions.

In some embodiments, the same eye gesture may be mapped to different functions in different power states. For example, the same eye gesture could be used to transition from the low power state to the full power state and vice versa.

Figure 3:
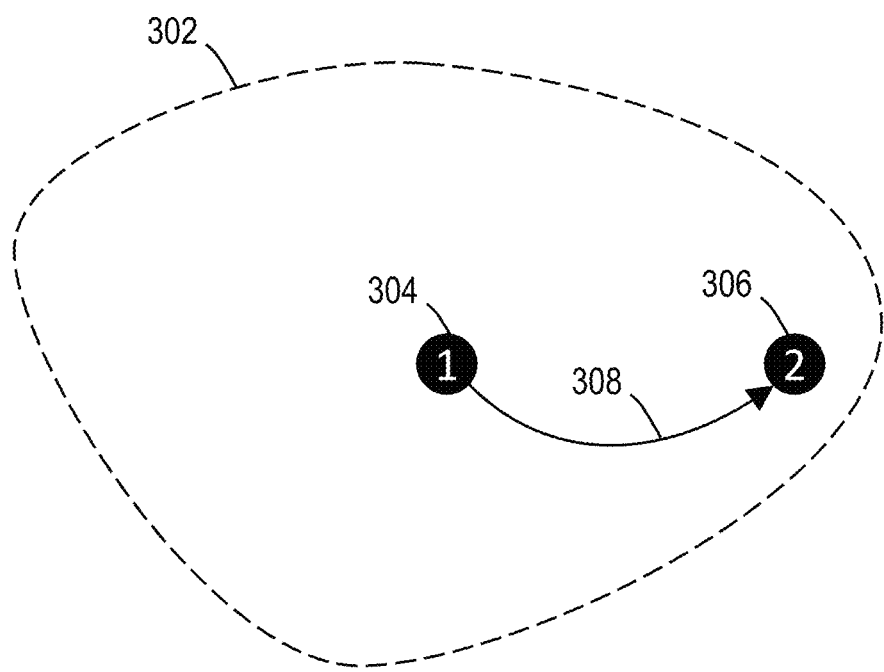
FIG. 3 is a diagram illustrating a first eye gesture detectable by an electronic contact lens system.

FIG. 3 illustrates a first example of an eye gesture, referred to herein as a "hold-saccade-hold" gesture. In the illustrated diagram, the dashed line 302 represents the approximate extent of the eye range of motion relative to the head. The filled circles at positions 304, 306 indicate positions where the user executes a pause in eye movement. The numbers in the filled circles at these positions 304, 306 indicate the sequential order of these pauses when the gesture is performed. The arrow indicates a saccade 308 executed between the paused positions 304, 306. Thus, in this gesture, the user first pauses at an initial position 304, then executes a saccade 308, then pauses again at an ending position 306. In an embodiment, detection of this gesture may be implemented using a state machine that sequentially detects the three motion segments: the initial pause at position 304, the saccade 308, and the pause at position 306.

Figure 4:
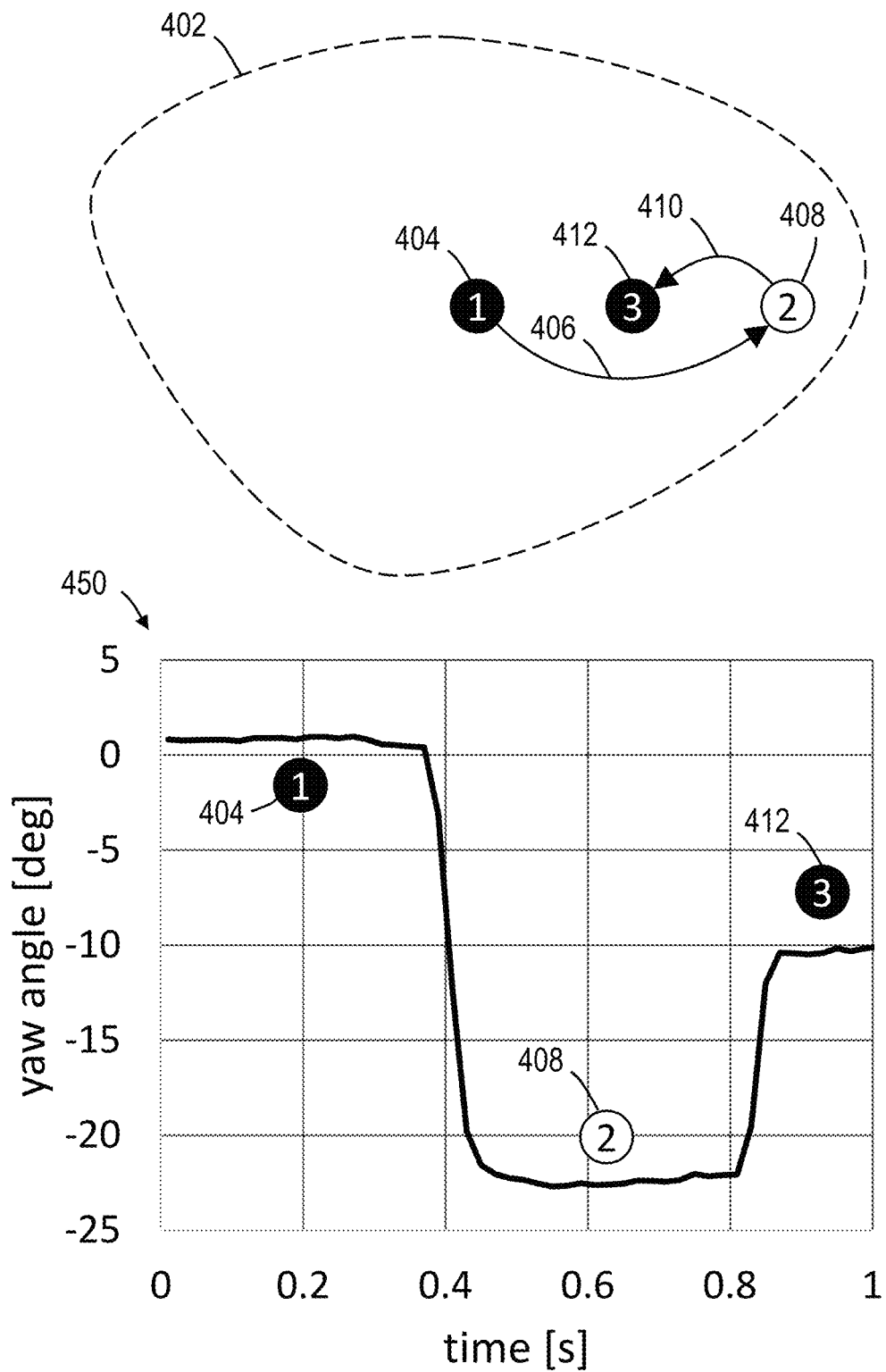
FIG. 4 is a diagram illustrating a second eye gesture detectable by an electronic contact lens system.

FIG. 4 illustrates a second example of an eye gesture, referred to herein as a "tap" gesture. A plot 450 of yaw angle over time is also illustrated for the tap gesture. In this gesture, the eye pauses at a first position 404, executes a first saccade 406 to a second position 408, executes a second saccade 410 in a direction opposite to the first saccade to arrive at a third position 412 that is in between the first position 404 and second position 408, and then pauses at the third position 412. In this diagram, the open circle at position 408 represents a pause of shorter duration than the pauses occurring at positions 404, 412. Here, at least a minimum time is expected between saccades 406, 410 corresponding to the pause at position 408 because the eye generally cannot execute consecutive saccades in different directions with a delay less than about 0.1-0.4 seconds. Thus, the pause at position 408 will fall within a predefined time window (having minimum and maximum durations) when the eye gesture is executed and is inclusive of the expected pause time when a user executes the saccades 406, 410 as quickly as possible (i.e., when the pause at position 408 is non-deliberate). In contrast, the pauses at positions 404, 412 are typically longer in duration and may be consistent with a user deliberately pausing.

When executing the tap gesture, the second saccade 410 involves a smaller change in orientation than the first saccade 406. Thus, if the first position 404 is near a center of the eye range 402, the second position 408 may be near a peripheral area of the range 402, and the third position 412 may be at an intermediate position between the center and peripheral areas. For example, if the first position 404 comprises a yaw angle of zero, the second position 408 and third position 412 both have yaw angles with the same sign (positive or negative), but the yaw angle at the second position 408 (e.g., −20 degrees) has a greater magnitude than the yaw angle at the third position 412 (e.g., −10 degrees). In an embodiment, detection of the tap gesture may be implemented by a state machine that sequentially detects the five motion segments: the first pause at position 404, the first saccade 406, the second pause at position 408, the second saccade 410, and the third pause at position 412. In an alternative variation, the tap gesture is detected based only on detecting the sequential saccades 406, 410 having the above-described characteristics, without necessarily expressly requiring detection of the beginning and ending pause periods.

Figure 5:
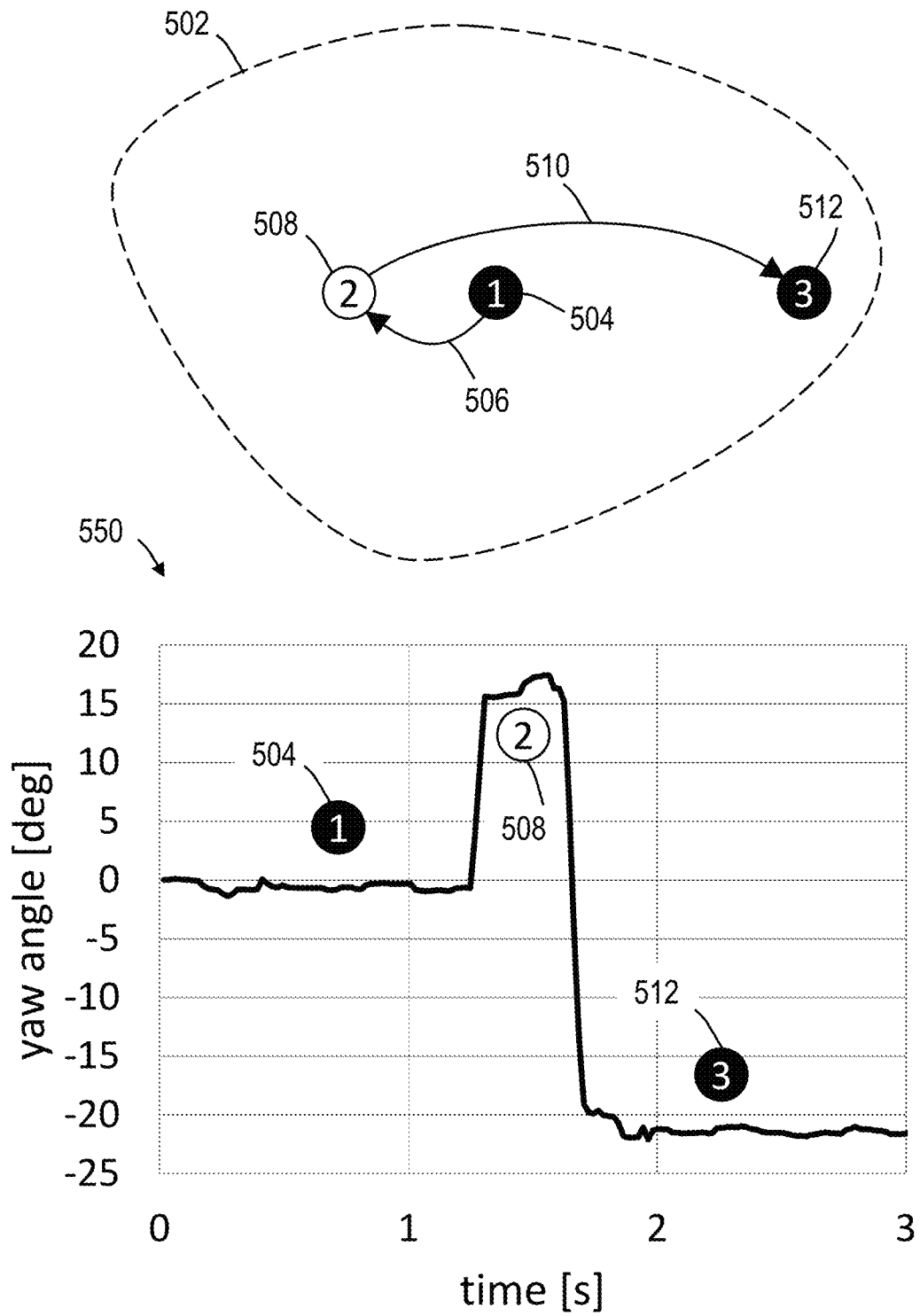
FIG. 5 is a diagram illustrating a third eye gesture detectable by an electronic contact lens system.

FIG. 5 illustrates a third example of an eye gesture, referred to herein as a "slingshot" gesture. A plot 550 of yaw angle over time is also illustrated for the slingshot gesture. In this gesture, the eye pauses at a first position 504, executes a first saccade 506 to a second position 508, executes a second saccade 510 in a direction substantially opposite the first saccade 506 to arrive at a third position 512 on an opposite side of the first position 504 relative to the second position 508, and then pauses at the third position 512. A pause also occurs at the second position 508 in between the saccades 506, 510 that is generally of shorter duration than the pauses occurring at positions 504, 512. This pause at position 508 has a duration in a predefined range (having a minimum and maximum duration), and may be inclusive of an expected duration of a non-deliberate pause occurring when the users attempts to execute the saccades 506, 510 as quickly as possible. In contrast to the tap gesture described above, the second saccade 510 of the slingshot gesture has a greater change in orientation than the first saccade 506. Thus, if the first position 504 is near a center of the eye range 502, the second position 508 may be at an intermediate position between the center and peripheral area of the range 502, and the third position 512 may be near the peripheral area of the range. Here, if the first position 504 has a yaw angle of zero, the yaw angles at the second position 508 and third position 512 have opposite signs. For example, the second position may have a positive yaw angle (e.g., 15 degrees), and the third position 512 has a negative yaw angle of greater magnitude than the second yaw angle (e.g., −20 degrees). In an embodiment, detection of the slingshot gesture may be implemented by a state machine that sequentially detects the five motion segments: the pause at position 504, the first saccade 506, the pause at position 508, the second saccade 510, and the pause at position 512. In an alternative variation, the slingshot gesture is detected based only on detecting sequential saccades 506, 510 having the above-described characteristics, without necessarily expressly requiring detection of the beginning and ending pause periods.

FIGS. 4-5 each illustrate examples of tap and slingshot gestures respectively in which the saccades 406, 410, 506, 510 are executed substantially along the horizontal axis representing change in yaw. In other examples, the gestures may be executed with saccades substantially along the vertical axis representing change in pitch. In yet further examples, the gestures may be executed along a different axis in the horizontal-vertical plane, representing changes in both pitch and yaw. Furthermore, for both tap and slingshot gestures, the saccades may be executed in the opposite direction than those shown.

In some embodiments, the motion analysis module 222 detects an eye gesture associated with a particular action regardless of the direction of the saccades. In other cases, the motion analysis module 222 detects an eye gesture that invokes a particular action only when the saccades are within a predefined range of directions. In this case, different actions may be associated with different eye gestures that differ only based on the direction of the saccades. For example, performing a gesture in a first direction may control navigation through a virtual menu in a forward direction while performing the same type of gesture in a second direction may control navigation through a virtual menu in a backward direction. Alternatively, the same type of gesture performed in different directions may access entirely different user interface functions.

Figure 6:
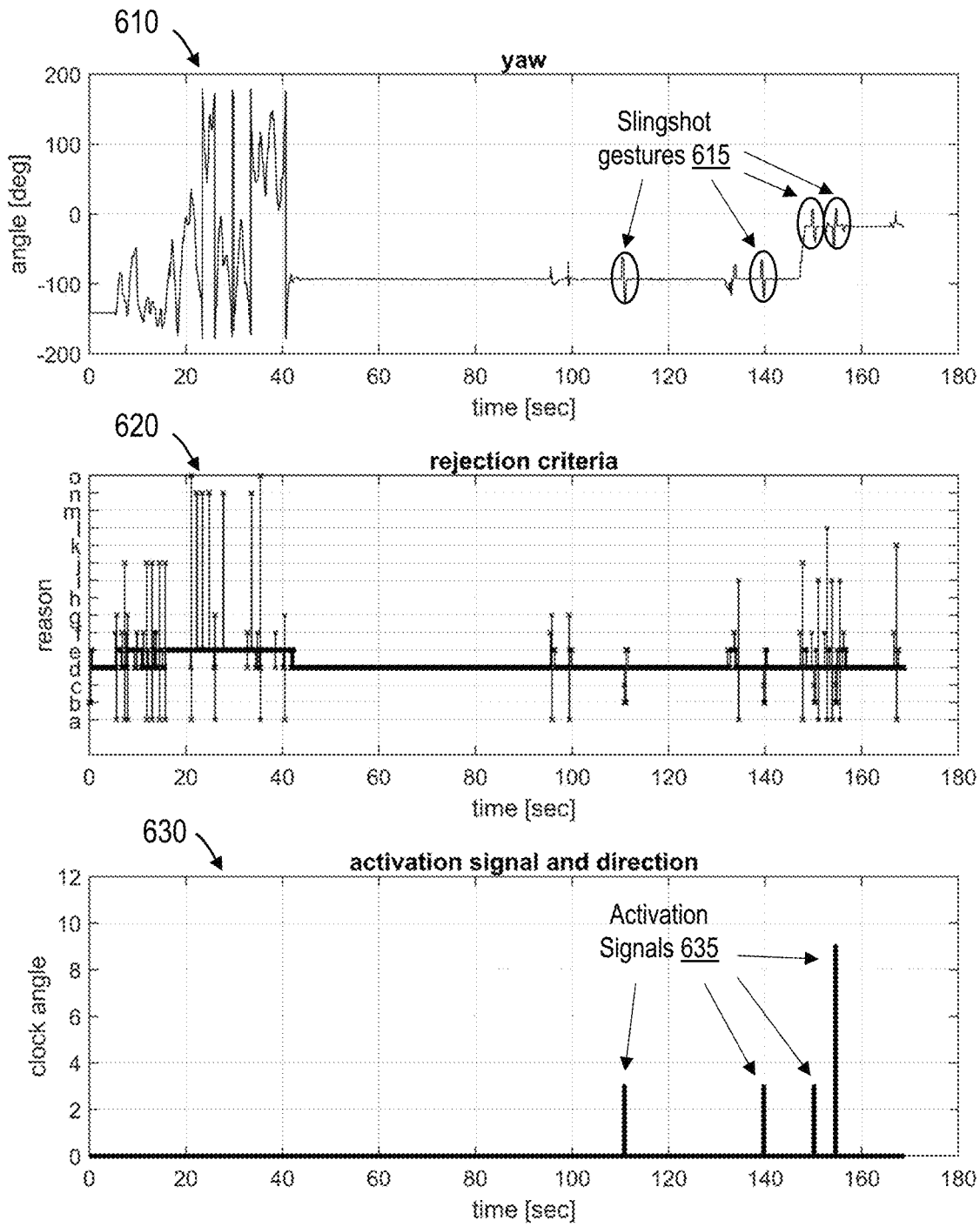
FIG. 6 is a diagram illustrating various signals tracked by an electronic contact lens system to enable detection of an eye gesture.

FIG. 6 illustrates a set of plots captured by an electronic contact lens system 200 configured to detect a slingshot gesture. A yaw plot 610 shows yaw angle over time as captured by the electronic contact lens system 200. Between approximately 0 to 40 seconds, the subject moved his head around extensively and rapidly without intentionally executing a slingshot gesture. Between approximately 40 to 145 seconds, the subject kept his head relatively still and executed slingshot gestures 615 at approximately 110 and 140 seconds. Between approximately 145 to 170 seconds, the subject executed additional slingshot gestures 615 at approximately 150 and 155 seconds with his head turned about 90 degrees from the starting position.

The rejection criteria plot 620 shows the assertion of various flags over time that each signify a reason (e.g., reasons a through o) for determining that the detect motion in a recent time window is not consistent with a slingshot gesture. Examples of reasons for asserting a flag may comprise, for example, detecting pause durations that are too long or too short, detecting motions that are outside of predefined magnitude ranges associated with the saccades, detecting too long or too short of a duration in between saccades, detecting a second saccade that is too short relative to the first saccade, detecting a second saccade in a direction that is not substantially opposite a direction of the first saccade, or other rejection criteria differentiating between the slingshot gesture and other eye and/or head movements.

In one implementation using a state machine, the possible reasons for asserting a rejection flag may vary over time. For example, in an initial state, the state machine seeks to detect the initial pause of the slingshot gesture and asserts a rejection flag when the eye fails to remain sufficiently stable (e.g., stays within a limited orientation range) for a long enough duration. In some implementations, the state machine may also assert a rejection flag when the initial gaze orientation is not within a predefined range of starting orientations (e.g., near a centered gaze orientation). In other embodiments, the initial gaze orientation is not necessarily detected. If the initial pause is detected (i.e., the state machine progressed to the second state), the state machine may assert a rejection flag when the first motion following the detected pause has too small or too large of a change in orientation or velocity for the first saccade 506. After the first saccade 506 is detected (i.e., the state machine progressed to a third state), the motion analysis module 222 may assert a rejection flag when a subsequent motion of sufficient magnitude occurs too soon or too long after first saccade to be consistent with the pause at position 508. After detecting the pause at position 508 (i.e., the state machine progressed to a fourth state), the motion analysis module 222 may assert a rejection flag when the subsequent motion is too small or too large of a change in orientation or velocity for the second saccade 510 or when the subsequent motion is along an axis of rotation outside of an expected range opposite the first saccade 506. After detecting the second saccade 510 (i.e., the state machine progressed to a fifth state), the motion analysis module 222 may assert a rejection flag when the eye fails to remain sufficiently stable (e.g., stays within a limited orientation range) for a long enough duration consistent with the final pause. Whenever a rejection flag is asserted, the state machine resets to the initial state.

In an embodiment, a pre-activation filter may operate to only initiate detection of a particular type of eye gesture when the electronic contact lens 110 is in a specific state. For example, when the electronic contact lens 110 is in a low power state, it may operate to detect an eye gesture for transitioning to the full power state but does not necessarily operate to detect other types of eye gestures that are only applicable in the full power state. Similarly, when the electronic contact lens 110 is in the full power state, it does not necessarily operate to detect an eye gesture that solely operates to invoke a transition to the full power state.

The activation signal and direction plot 630 shows activation signals 635 that are asserted when a slingshot gesture 615 is detected (e.g., at approximately 110 seconds, 140 seconds, 150 seconds, and 155 seconds). In this embodiment, the magnitude of the activation signal represents a direction of the detected gesture. Here, the angle of the gesture is represented as a value between 0 and 12 corresponding to the angles on a clock. The direction may be indicative of either the first saccade or the second saccade in different embodiments. In the illustrated example, the activation signals 635 show that the fourth slingshot gesture 615 occurring at 155 seconds was initiated in the opposite direction than the first three slingshot gestures 615 occurring at 110 seconds, 140 seconds, and 150 seconds.

The activation signal and direction plot 630 shows that no activation signal was detected when the slingshot gesture 615 was not deliberately executed. Thus, the electronic contact lens system 200 successfully distinguished between periods of random eye and/or head movements (such as between 0 and 40 seconds) and deliberate execution of the slingshot gesture. Furthermore, the electronic contact lens system 200 correctly detected each intentional execution of the slingshot gesture.

Figure 7:
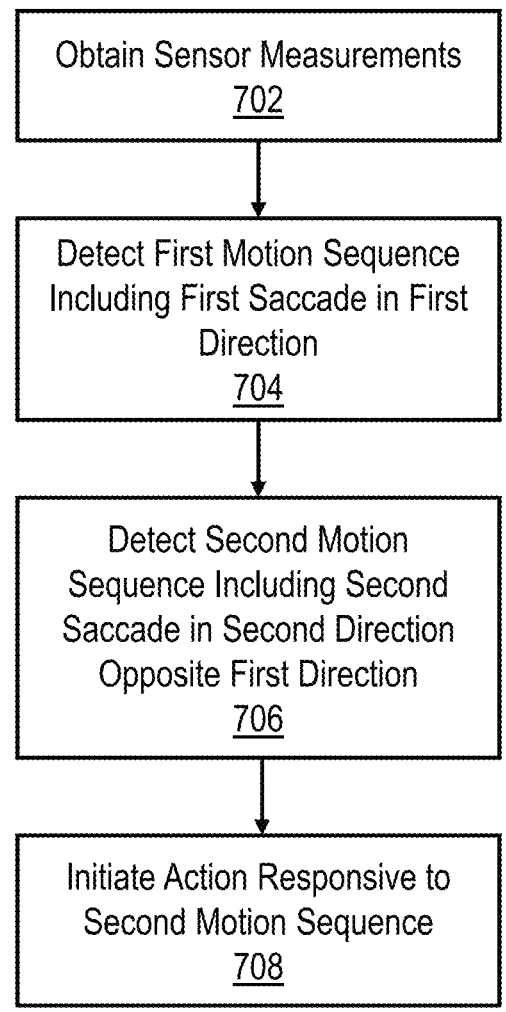
FIG. 7 is a flowchart illustrating an example embodiment of a process for controlling a function of an electronic contact lens responsive to a detected eye gesture.

FIG. 7 is a flowchart illustrating an example embodiment of a process for controlling an electronic contact lens system 200 based on detected eye gestures involving two saccades (e.g., tap gestures or slingshot gestures). The electronic contact lens system 200 obtains 702 sensor measurements from an electronic contact lens 110. The electronic contact lens system 200 detects 704 a first motion sequence that includes a first saccade in a first direction. Detecting the first motion sequence may also include detecting a pause of sufficient stability and duration prior to the first saccade. Furthermore, in one embodiment, detecting the first motion sequence may include detecting that the initial gaze orientation at the start of the first saccade is within a predefined range of gaze orientations. Subsequently, the electronic contact lens system 200 detects 706 a second motion sequence including a second saccade in a second direction substantially opposite the first direction that occurs during a specified time window following the first saccade. The specified time window may have a both lower and upper bound that is inclusive of the expected time between saccades when the user attempts to execute the saccades consecutively without deliberately pausing. Detecting the second motion sequence may furthermore include detecting a pause of sufficient stability and duration following the second saccade. The electronic contact lens system 200 initiates 708 an action based on the sequentially detecting the first and second motion sequences including the first and second saccades. For example, the electronic contact lens system 200 may change the power state of the electronic lens 110 or initiate a user interface function.

In an alternative embodiment, the techniques described herein can apply to an augmented, virtual reality system, or a displayless eye-tracking system that is not necessarily embodied as an electronic contact lens 110. For example, in an embodiment, the described eye gestures can be recognized by a glasses-type augmented reality device or a different type of head-mounted device. In these embodiments, motion data may be captured from an eye-facing camera integrated in the head-mounted device instead of from motion sensors mounted directly to the eye. Here, images captured from the integrated camera are processed to estimate eye movements and to detect gestures from those eye movements using the same techniques described above in FIGS. 3-7. In yet further embodiments, a different eye tracking system may be used that is not necessarily camera-based. For example, a light scanning system may track eye movements by scanning light across the eye and detecting reflections using a light sensor. In any of the above embodiments, the eye gestures may be used to control functions of the head-mounted device or an external system similar to those described above, such as switching between power states and/or interacting with virtual menus or other objects.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software and/or combinations thereof. Implementations can be implemented in a computer program product tangibly embodied in a non-transitory computer-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from and to transmit data and instructions to, a data storage system, at least one input device and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Any of the foregoing can be supplemented by, or incorporated in, ASICs (application-specific integrated circuits) and other forms of hardware.

The invention claimed is:

1. A method for initiating an action responsive to identifying an eye gesture of an eye, the method comprising:
    obtaining sensor measurements representing eye movement;
    detecting an operational state associated with operation of an electronic contact lens;
    after detecting the operational state, detecting, based on the sensor measurements, a first saccade comprising a first change in orientation in a first direction;
    during a specified time window following detection of the first saccade, detecting, based on the sensor measurements, a second saccade comprising a second change in orientation in a second direction substantially opposite the first direction; and
    initiating the action based on detecting the second saccade during the specified time window following the detecting of the first saccade, wherein initiating the action is further responsive to the operational state being one of a predefined set of operational states associated with initiating the action.

2. The method of claim 1, further comprising:
    detecting, based on the sensor measurements, a pause period in between the first saccade and the second saccade in which the eye meets stability criteria over a time duration within a predefined range; and
    wherein initiating the action is further based on detecting the pause period in between the first saccade and the second saccade.

3. The method of claim 1, further comprising:
    detecting, based on the sensor measurements, a first pause period prior to the first saccade in which the eye meets first stability criteria for at least a first threshold time duration;
    detecting, based on the sensor measurements, a second pause period after the second saccade in which the eye meets second stability criteria for at least a second threshold time duration; and
    wherein initiating the action is further based on detecting the first pause period prior to the first saccade and detecting the second pause period after the second saccade.

4. The method of claim 1,
    wherein detecting the first saccade comprises detecting a first magnitude of the first change in orientation; and
    wherein detecting the second saccade comprises detecting that the second change in orientation of the second saccade has a second magnitude less than the first magnitude.

5. The method of claim 1,
    wherein detecting the first saccade comprises detecting that the first change in orientation is consistent with a motion from a centered gaze orientation to a peripheral gaze orientation; and
    wherein detecting the second saccade comprises detecting that the second change in orientation is consistent with a motion from the peripheral gaze orientation to an intermediate gaze orientation between the center gaze orientation and the peripheral gaze orientation.

6. The method of claim 1,
    wherein detecting the first saccade comprises detecting a first magnitude of the first change in orientation; and
    wherein detecting the second saccade comprises detecting that the second change in orientation of the second saccade has a second magnitude greater than the first magnitude.

7. The method of claim 1,
    wherein detecting the first saccade comprises detecting that the first change in orientation is consistent with a motion from a center gaze orientation to an intermediate gaze orientation; and
    wherein detecting the second saccade comprises detecting that the second change in orientation is consistent with a motion from the intermediate gaze orientation to a peripheral gaze orientation.

8. The method of claim 1,
    wherein detecting the first saccade comprises detecting that a first magnitude of the first saccade is within a first predefined magnitude range; and
    wherein detecting the second saccade comprises detecting that a second magnitude of the second saccade is within a second predefined magnitude range.

9. The method of claim 1,
    wherein detecting the first saccade comprises detecting that a first velocity of the first saccade is within a first predefined velocity range; and
    wherein detecting the second saccade comprises detecting that a second velocity of the second saccade is within a second predefined velocity range.

10. The method of claim 1, wherein detecting the first saccade comprises:
    detecting that the first saccade begins from within a predefined distance of a predefined starting gaze orientation.

11. The method of claim 1, further comprising:
    storing respective mappings between a set of directions and a set of actions; and
    selecting the action based on the respective mappings and at least one of the first direction of the first saccade and the second direction of the second saccade.

12. The method of claim 1, wherein the action comprises changing a power state of an electronic contact lens.

13. The method of claim 12, wherein changing the power state comprises enabling or disabling at least one of a gyroscope, a femtoimager, and a femtoprojector of an electronic contact lens.

14. The method of claim 1, wherein the action comprises selecting a virtual menu item presented by an electronic contact lens.

15. The method of claim 1, wherein obtaining the sensor measurements comprises:
    obtaining sensor measurements from integrated sensors of an electronic contact lens.

16. The method of claim 1, wherein obtaining the sensor measurements comprises:

obtaining sensor measurements based on images captured from a camera of a head-mounted device.

17. An electronic contact lens system comprising:
an electronic contact lens mountable to an eye, the electronic contact lens having at least one motion sensor for obtaining sensor measurements representing sensed motion of the eye;
a processing device comprising:
a processor; and
a non-transitory computer-readable storage medium for storing instructions executable by the processor, the instructions when executed causing the processor to perform steps including:
obtaining the sensor measurements;
detecting an operational state associated with operation of an electronic contact lens;
after detecting the operational state, detecting, based on the sensor measurements, a first saccade comprising a first change in orientation in a first direction;
during a specified time window following detection of the first saccade, detecting, based on the sensor measurements, a second saccade comprising a second change in orientation in a second direction substantially opposite the first direction; and
initiating an action based on detecting the second saccade during the specified time window following the detection of the first saccade, wherein initiating the action is further responsive to the operational state being one of a predefined set of operational states associated with initiating the action.

18. The electronic contact lens system of claim 17, wherein the instructions when executed further cause the processor to perform steps including:
detecting, based on the sensor measurements, a pause period in between the first saccade and the second saccade in which the eye meets stability criteria over a time duration within a predefined range; and
wherein initiating the action is further based on detecting the pause period in between the first saccade and the second saccade.

19. The electronic contact lens system of claim 17, wherein the instructions when executed further cause the processor to perform steps including:
detecting, based on the sensor measurements, a first pause period prior to the first saccade in which the eye meets first stability criteria for at least a first threshold time duration;
detecting, based on the sensor measurements, a second pause period after the second saccade in which the eye meets second stability criteria for at least a second threshold time duration; and
wherein initiating the action is further based on detecting the first pause period prior to the first saccade and detecting the second pause period after the second saccade.

20. The electronic contact lens system of claim 17,
wherein detecting the first saccade comprises detecting a first magnitude of the first change in orientation; and
wherein detecting the second saccade comprises detecting that the second change in orientation of the second saccade has a second magnitude less than the first magnitude.

21. The electronic contact lens system of claim 17,
wherein detecting the first saccade comprises detecting a first magnitude of the first change in orientation; and
wherein detecting the second saccade comprises detecting that the second change in orientation of the second saccade has a second magnitude greater than the first magnitude.

22. A non-transitory computer-readable storage medium storing instructions for initiating an action responsive to identifying an eye gesture, the instructions when executed by one or more processors causing the one or more processors to perform steps comprising:
obtaining sensor measurements;
detecting an operational state associated with operation of an electronic contact lens;
after detecting the operational state, detecting, based on the sensor measurements, a first saccade comprising a first change in orientation in a first direction;
during a specified time window following detection of the first saccade, detecting, based on the sensor measurements, a second saccade comprising a second change in orientation in a second direction substantially opposite the first direction; and
initiating the action based on detecting the second saccade during the specified time window following the detecting of the first saccade, wherein initiating the action is further responsive to the operational state being one of a predefined set of operational states associated with initiating the action.

* * * * *